ELECTRON BEAM CONVERSION SYSTEMS

Filed July 6, 1956

INVENTOR
HENRY ZUCKER
BY Elmer J. Gorn
ATTORNEY

United States Patent Office 2,987,646
Patented June 6, 1961

2,987,646

ELECTRON BEAM CONVERSION SYSTEMS

Henry Zucker, Chicago, Ill., assignor to Raytheon Company, a corporation of Delaware Filed July 6, 1956, Ser. No. 596,273
5 Claims. (Cl. 315—13)

Figures 1, 2:
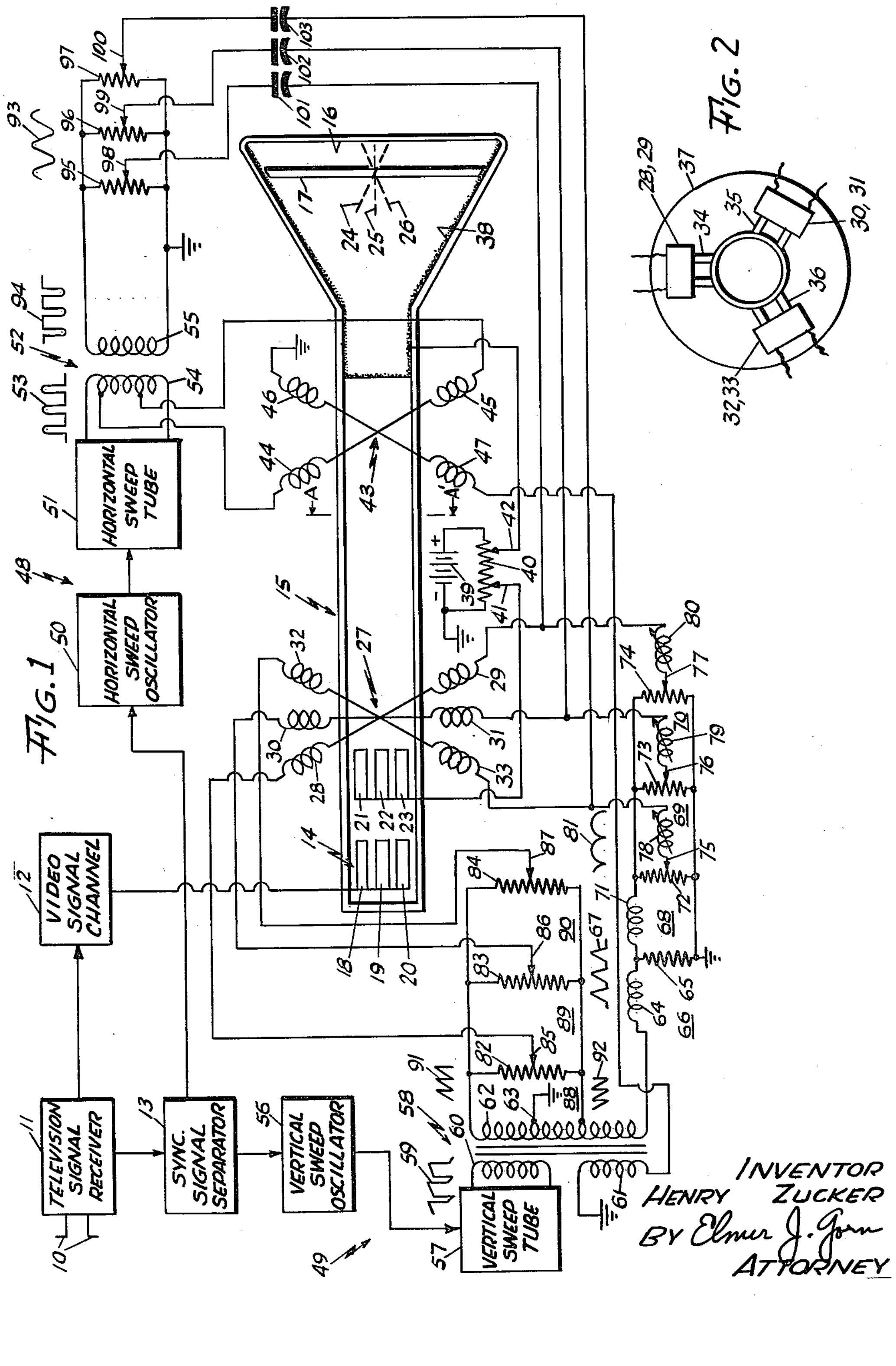

This invention relates to systems for controlling the electron beams of cathode ray tubes. It pertains particularly to the control of a plurality of electron beam components used in a cathode ray tube so as to effect convergence of said beam components at all points of a raster scanned in a predetermined plane.

The problem of controlling the convergence of a plurality of electron beam components as they are deflected to scan a raster at a target electrode, for example, one lying in a predetermined plane, is one which is frequently encountered in color television receivers. In order to reproduce specific colors of a transmitted scene, it is necessary to have a plurality of electron beams, from a single or multiple electron guns and bearing a fixed relationship to said colors, impinge on the corresponding colored phosphors deposited on the face of the cathode ray tube. However, since the distance from a single electron gun or from multiple electron guns to all points on the raster varies as the electron beam scans vertically and horizontally, it is necessary to provide field-producing means to compensate for the change of distance between the electron source and the phosphor coating. Said field-producing means is usually mounted on the neck of the cathode ray tube and includes beam-convergence windings for each of the electron beams generated in the cathode ray tube. Means are then provided for energizing said field-producing means to produce dynamic convergence control of the beam paths.

Ideally, the dynamic convergence control of the beam paths for the horizontal and vertical sweep or scanning frequencies should vary substantially as parabolic functions. Thus, parabolic waves at the horizontal and vertical frequencies are required to energize said convergence windings. However, considerable difficulty and costly components have heretofore been required to produce these ideal energizing wave forms, particularly at the vertical scanning frequency. It is an object of the present invention to disclose improved and simplified apparatus by which to develop parabolic waves at the vertical scanning frequency. However, the invention need not be limited to parabolic waves at the vertical scanning frequency.

The phrase "electron beam components" as used in this specification and claims will be understood to denote the phosphor-exciting electron energy generated by a single or by a plurality of electron guns. This energy may be continuous or pulsating as required without departing from the scope of the invention.

In accordance with the present invention, parabolic waves at the vertical scanning frequency are generated to energize the field-producing means by utilizing the output of the vertical sweep generator, without employing much additional or complicated circuitry. On the other hand, said field-producing means may be energized by parabolic or sinusoidal waves at the horizontal scanning frequency to effect substantial convergence of the beam components.

Accordingly, the output of the vertical sweep generator, which is preferably a voltage having a sawtooth wave constituent for energizing the vertical focus deflection windings, is used to generate parabolic waves at the vertical scanning frequency. A first integrating means, energized by a secondary winding of the vertical output transformer, is used to generate substantially pure sawtooth waves. A plurality of integrating means, in a plurality of branches is coupled to and responsive to the output of the first integrating means. Said plurality of integrating means integrates said sawtooth waves into parabolic waves at the vertical scanning frequency. These parabolic waves are coupled to the beam-convergence coils of the field-producing means. Heretofore, the practice of generating parabolic waves from the output of the vertical sweep tube has either required elaborate circuitry to generate parabolic waves or said parabolic waves were necessarily contaminated with an undesirable sawtooth component of the vertical output wave shape. However, the present invention involves a method whereby this undesirable effect can be eliminated without elaborate circuitry.

In the system in which the invention is described, sinusoidal waves at the horizontal scanning frequency are generated by utilizing the output of the horizontal sweep generator in a manner known to the prior art. Said sinusoidal waves are also coupled to beam convergence windings of the field-producing means to effect substantial convergence of the beam components.

The novel features that are considered characteristic of the invention are set forth with particularity in the appended claims. The invention itself, however, both as to its organization and method of operation, as well as additional objects and advantages thereof, will best be understood from the following description when read in connection with the accompanying drawing.

FIG. 1 is a block diagram of a color television receiver with pertinent parts of the invention shown in schematic diagram form; and FIG. 2 is a cross-sectional view along the line A—A′ of a field-producing means for affecting convergence of electron beams.

As shown in FIG. 1, an antenna 10 is shown connected to a conventional television signal receiver 11. It will be understood that the receiver 11 may include such usual apparatus as radio and intermediate frequency amplifiers, frequency converters, and signal detectors. Accordingly, there is derived from such a conventional receiver 11 video and synchronizing signals. The video signals are coupled to a video signal channel 12 and the synchronizing signals are coupled to a sync signal separator 13. The video signal channel is coupled to electron gun apparatus 14 of a conventional cathode ray tube 15, such as is employed in color television receivers. Said tube 15 has a substantially flat luminescent screen 16, comprised of phosphor areas arranged in groups, which are capable of responding to electron beam components impinged thereon to produce different colors. In back of and spaced from the screen 16 is an apertured masking electrode 17, having apertures in alignment with each phosphor group deposited on the screen 16. As illustrated, the tube 15 has a plurality of electron guns 18, 19, and 20 equal to the number of primary colors to be reproduced. The guns 18, 19, and 20 may be of the conventional type used, consisting of a cathode, control grid, and a first anode. Also associated with the three guns are corresponding beam-focusing anodes 21, 22, and 23. Electron beams 24, 25, and 26, developed by said guns, are accelerated toward the screen 16 by the operation of the beam-focusing anodes. The electron beams 24, 25, and 26 approach the screen from three different angles and are shown in exaggerated form for purposes of illustration.

The tube 15 is also provided with a field-producing device 27, having three pairs of interconnected coils 28 and 29, 30 and 31, and 32 and 33 comprising the beam-convergence windings and said coils may be wound on permanent magnets 34, 35, and 36. Thus, there is provided electromagnetic and electrostatic means for causing substantial convergence of said beam components. The beam-convergence windings and magnets are disposed around the neck of the tube 15 secured to a ring 37, as shown in FIG. 2, so as to effect convergence of each electron beam component. The ring 37 may be positioned in the vicinity of the beam-focusing anodes 21, 22, and 23. The beam-convergence windings are energized by a beam-convergence energizing means, to be described subsequently. In addition, the tube 15 is provided with a final accelerating anode 38, which may be a conductive coating extending over the interior of the conical section and a portion of the neck.

A positive D.C. supply 39 and a voltage divider resistor 40 connected in parallel therewith may be used to provide voltages for the beam-focusing anodes 21, 22, and 23 and the final accelerating anode 38. Variable wiper arms 41 and 42 are connected to said anodes 21, 22, and 23, and 38 to provide means for adjusting the voltages applied thereto. The tube 15 is also provided with a yoke device 43, with which to electromagnetically deflect the plurality of electron beam components in the vertical and horizontal planes to scan the usual raster at the screen 16. The yoke device may be of the conventional type, consisting of a pair of interconnected coils 44 and 45 forming a horizontal deflection winding and another pair of coils 46 and 47 forming a vertical deflection winding. Physically, the yoke device is placed on the neck of the tube in the vicinity of the junction of the conical section to the tube and the neck. Suitable connections are also available for energizing the yoke device with the outputs of the horizontal sweep and the vertical sweep, or scanning generators 48 and 49. An output from the sync signal separator 13 may be used to trigger the horizontal sweep or scanning generator 48. The generator may be comprised of a horizonatal sweep oscillator 50, the horizontal sweep tube 51, and an iron-core transformer 52 connected to said horizontal sweep tube. In accordance with the usual practice, the output of the horizontal sweep tube may be a square wave 53 at the horizontal scanning frequency. Square waves generated in a primary winding 54 of the transformer 52 may be coupled to the horizontal deflection windings, including coils 44 and 45, to develop sawtooth wave current in said coils at the horizontal scanning frequency. A secondary winding 55 of the transformer 52 is used to energize the portion of the beam-convergence energizing means generating sinusoidol waves at the horizontal scanning frequency. The beam-convergence energizing means is described in a subsequent paragraph.

In a similar manner the output of the sync signal separator 13 may be used to energize the vertical sweep generator 49. This generator may be comprised of a vertical sweep oscillator 56, a vertical sweep tube 57, and an iron-core transformer 58. In accordance with the usual practice, the output of the vertical sync separator is used to energize the vertical sweep oscillator 56 which, in turn, energizes the vertical sweep tube 57. Since it is desirable to provide the vertical deflection windings including coils 46 and 47 with a sawtooth wave rising above a linear pedestal, components of the vertical sweep oscillator 56 may be selected so that a wave form 59 is generated in a primary winding 60 of the transformer 58. A separate winding 61 of the transformer 58 is employed to couple the wave shapes 59 to the vertical deflection winding. A secondary winding 62 of the transformer 58 is used to energize the portion of the beam-convergence energizing means generating parabolic waves at the vertical scanning frequency. The secondary winding 62 has a grounded tap 63.

An inductor 64 having one terminal thereof connected to one terminal of the secondary winding 62 of the transformer 58, and having a second terminal connected to ground through a resistor 65, comprises a first integrating network 66. Substantially pure sawtooth waves 67 are generated across the resistor 65 and are coupled to integrating networks 68, 69 and 70, comprised of the inductor 71 in series to ground with three parallel resistance branches having variable resistors 72, 73 and 74. Wiper arms 75, 76 and 77 of said variable resistors are each connected through an adjustable inductor 78, 79 and 80 to an input terminal of each of the three beam-convergence windings comprising the field-producing means 27. In this manner, parabolic waves 81 at the vertical scanning frequency are coupled to the field-producing means.

Variable resistors 82, 83 and 84 are connected in shunt with the portion of the secondary winding 62 having the grounded tap 63. Each portion of said variable resistors, determined by the settings of wiper arms 85, 86 and 87, may be considered as a resistance in series to ground with each portion of the grounded secondary winding 62. Thus, the inductor and each variable resistor comprises an integrating network 88, 89 and 90 for developing sawtooth waves 91 and 92, 180 degrees out of phase with respect to each other at the vertical scanning frequency. Said sawtooth waves 91 and 92 are coupled to a second input terminal of the beam-convergence windings from the wiper arms 85, 86 and 87 of the variable resistors 82, 83 and 84. The setting of said wiper arms provides for phase adjustment of the parabolic waves at the vertical scanning frequency.

The coils of the beam-convergence windings are also energized by sinusoidal waves 93 at the horizontal scanning frequency. The secondary winding 55 of the transformer 52 has induced in it a voltage wave form 94, 180 degrees out of phase with respect to the wave form 53. The waveform 94 is also developed across the potentiometers 95, 96 and 97, connected in shunt with the secondary winding 55. A portion of this voltage, selected by the setting of the wiper arms 98, 99 and 100 of said potentiometers, is coupled through the capacitors 101, 102 and 103 to the same input terminals of the beam-convergence coils fed by said parabolic waves at the vertical scanning frequency. The capacitors 101, 102 and 103 are a part of a series resonant circuit for adjusting the phase of sinusoidal waves coupled to said beam-convergence coils. An analysis of the circuitry for one series resonant circuit is included, but the description is equally applicable to the two remaining circuits coupling sinusoidal waves to said beam-convergence coils. The capacitor 101 is connected to ground through two parallel legs. A first leg is comprised of the coils 28 and 29, the wiper arm 85 and a portion of the potentiometer 82, and a portion of the secondary winding 62. A second leg is comprised of the adjustable inductor 80, the wiper arm 77 and a portion of the potentiometer 74. The wiper arms 77 and 85 may be considered to be at ground potential since the impedance to ground in each circuit is extremely small. In effect then, the circuit may be visualized as the capacitor 101 connected to the parallel combination of coils 28 and 29 and the inductor 80. The simplified circuit of these components may be replaced to be a single series resonant circuit comprised of the capacitor in series to ground with an adjustable inductor. Components comprising the other two circuits similarly form series resonant circuits.

In summation, there has been described a beam-convergence energizing means for generating parabolic waves at the vertical scanning frequency for energization of beam-convergence windings to effect substantial convergence of electron beam components to scan a raster in a predetermined plane. An integrating network 66 is employed to generate substantially pure sawtooth waves 67 at the vertical scanning frequency. A plurality of integrating networks 68, 69 and 70, coupled to and responsive to said sawtooth waves, provide parabolic waves for the beam-convergence windings at the vertical scanning frequency. In addition, a source of sawtooth waves 91 and 92 at the vertical scanning frequency is generated in a plurality of integrating networks 88, 89 and 90, which are each coupled to a beam-convergence winding. Said sawtooth waves are effective to control the phase of said parabolic waves at the vertical scanning frequency. However, said beam-convergence winding is energized in a conventional manner by sinusoidal waves at the horizontal scanning frequency. In this manner dynamic beam convergence is achieved.

Having described the embodiment of the invention for generating parabolic waves at the vertical scanning frequency, it is desired that the scope of the invention not be limited to the energizing voltages used to describe the invention. It is readily foreseeable that the invention can be adapted, by the interchange of components comprising the various integrating networks, to energizing wave forms of either polarity at the vertical scanning frequency without departing from the scope of the invention. Accordingly, it is desired that the appended claims be given a broad interpretation commensurate with the scope of the invention within the art.

What is claimed is:

1. In combination, a cathode ray tube system comprising a luminescent screen, means for generating electron beam components to impinge on said luminescent screen, horizontal and vertical scanning generators, principal deflection means connected to said horizontal and vertical scanning generators for deflecting said electron beam components horizontally and vertically to scan a raster on said luminescent screen, convergence means for effecting substantial convergence of said electron beam components comprising an integrating means connected to one of said scanning generators and responsive to the output of said scanning generator for producing a substantially pure sawtooth wave, a plurality of adjustable parallel networks connected to said integrating means and responsive to said sawtooth wave for producing a plurality of substantially parabolic waves, and parallel auxiliary deflection means connected to each of said parallel networks for independently controlling the impinging angles of each of said electron beam components on said luminescent screen.

2. In combination, a cathode ray tube system comprising a luminescent screen, means for generating electron beam components to impinge on said luminescent screen, horizontal and vertical scanning generators, principal deflection means connected to said horizontal and vertical scanning generators for deflecting said electron beam components horizontally and vertically to scan a raster on said luminescent screen, convergence means for effecting substantial convergence of said electron beam components comprising an integrating means connected to said vertical scanning generator and responsive to the output of said vertical scanning generator for producing a substantially pure sawtooth wave, a plurality of adjustable parallel networks connected to said integrating means and responsive to said sawtooth wave for producing a plurality of substantially parabolic waves, and parallel auxiliary deflection means connected to each of said parallel networks for independently controlling the impinging angles of each of said electron beam components on said luminescent screen.

3. In combination, a cathode ray tube system comprising a luminescent screen, means for generating electron beam components to impinge on said luminescent screen, horizontal and vertical scanning generators, principal deflection means connected to said horizontal and vertical scanning geernators for deflecting said electron beam components horizontally and vertically to scan a raster on said luminescent screen, convergence means for effecting substantial convergence of said electron beam components comprising an integrating means connected to said vertical scanning generator and responsive to the output of said vertical scanning generator for producing a substantially pure sawtooth wave, a first plurality of adjustable parallel networks connected to said integrating means and responsive to said sawtooth wave for producing a plurality of substantially parabolic waves, a second plurality of adjustable parallel networks connected to said vertical scanning generator for adjusting the phase of said parabolic waves, and parallel auxiliary deflection means connected to said first and said second plurality of adjustable parallel networks for independently controlling the impinging angles of each of said electron beam components on said luminescent screen.

4. In combination, a cathode ray tube system comprising a luminescent screen, means for generating electron beam components to impinge on said luminescent screen, horizontal and vertical scanning generators, principal deflection means connected to said horizontal and vertical scanning generators for deflecting said electron beam components horizontally and vertically to scan a raster on said luminescent screen, convergence means for effecting substantial convergence of said electron beam components, comprising an integrating means connected to said vertical scanning generator and responsive to the output of said vertical scanning generator for producing a substantially pure sawtooth wave, a first plurality of adjustable networks connected to said integrating means and responsive to said sawtooth wave for producing a plurality of substantially parabolic waves, a second plurality of adjustable parallel networks connected to said vertical scanning generator for adjusting the phase of said parabolic waves, a third plurality of adjustable parallel networks connected to said horizontal scanning generator, and parallel auxiliary deflection means connected to said first, said second, and said third plurality of adjustable parallel networks for independently controlling the impinging angles of each of said electron beam components on said luminescent screen.

5. In combination, a cathode ray tube system comprising a luminescent screen, means for generating electron beam components to impinge on said luminescent screen, horizontal and vertical scanning generators, principal deflection means connected to said horizontal and vertical scanning generators for deflecting said electron beam components horizontally and vertically to scan a raster on said luminescent screen, convergence means for effecting substantial convergence of said electron beam components comprising an integrating means connected to said vertical scanning generator and responsive to the output of said vertical scanning generator for producing a substantially pure sawtooth wave, a first plurality of parallel networks connected to said integrating means including a first plurality of adjustable resistances for producing a plurality of substantially pure parabolic waves, a second plurality of parallel networks connected to said vertical scanning generator including a second plurality of adjustable resistances for adjusting the phase of said substantially pure parabolic waves, a third plurality of parallel networks connected to said horizontal scanning generator including a third plurality of adjustable resistances and a plurality of adjustable inductances for producing substantially pure sine waves, and parallel auxiliary deflection means connected to said first, second, and third plurality of parallel networks for independently controlling the impinging angles of each of said electron beam components on said luminescent screen.

References Cited in the file of this patent

UNITED STATES PATENTS

| | | |
|---|---|---|
| 2,672,574 | Evans | Mar. 16, 1954 |
| 2,682,615 | Sziklai | June 29, 1954 |
| 2,706,796 | Tannenbaum | Apr. 19, 1955 |
| 2,707,248 | Goodrich | Apr. 26, 1955 |
| 2,743,389 | Ginffrida | Apr. 24, 1956 |

UNITED STATES PATENT OFFICE
CERTIFICATE OF CORRECTION

Patent No. 2,987,646 June 6, 1961

Henry Zucker

It is hereby certified that error appears in the above numbered patent requiring correction and that the said Letters Patent should read as corrected below.

In the heading to the drawings, line 2, and in the heading to the printed specification, line 2, title of invention for "CONVERSION", each occurrance, read -- CONVERGENCE --; column 5, line 61, for "geernators" read -- generators --.

Signed and sealed this 14th day of November 1961.

(SEAL)
Attest:

ERNEST W. SWIDER
Attesting Officer

DAVID L. LADD
Commissioner of Patents

USCOMM-DC